Patented June 5, 1951

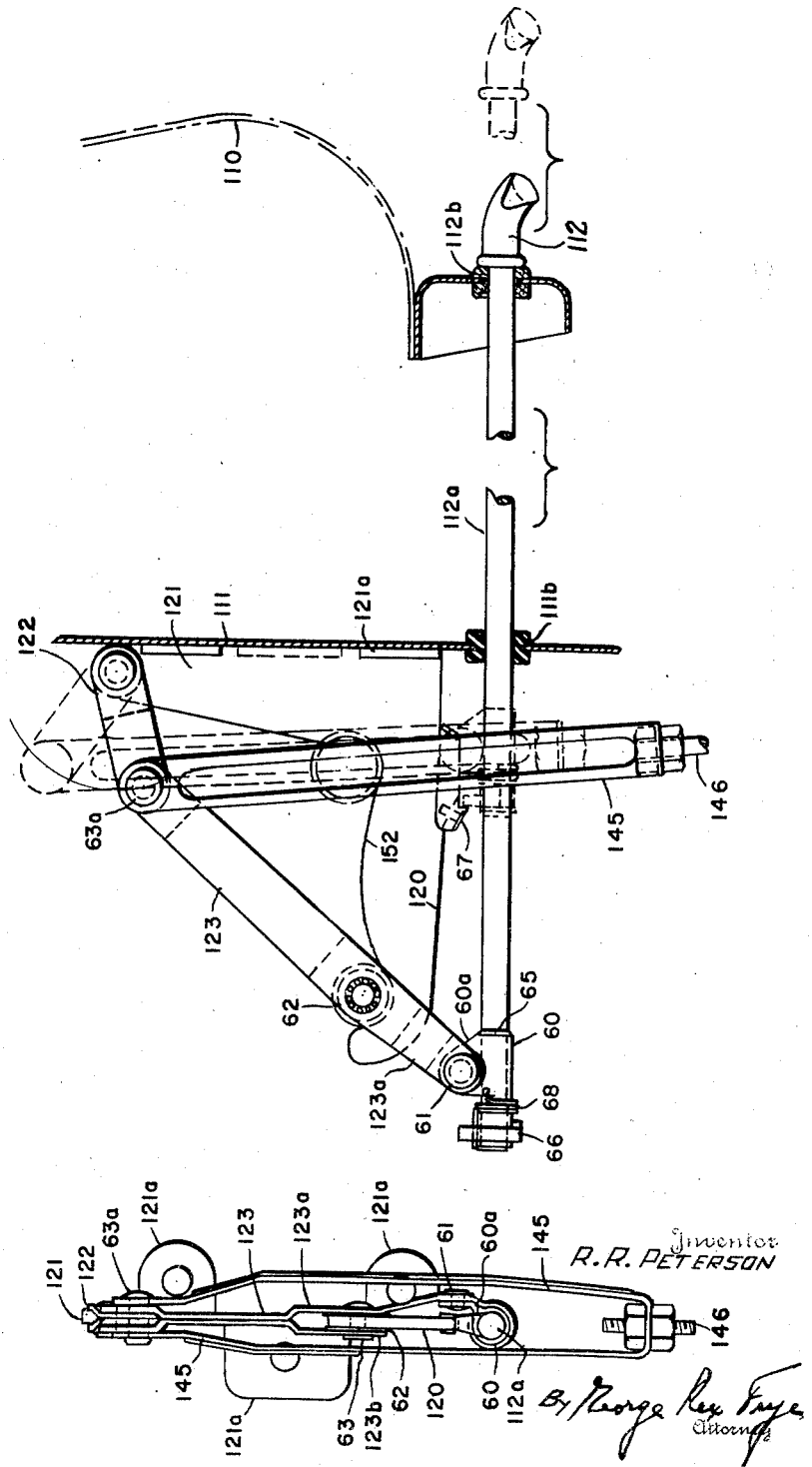

2,555,811

UNITED STATES PATENT OFFICE 2,555,811

VARIABLE OUTPUT HAND-OPERATED BRAKE CABLE ACTUATOR

Raymond R. Peterson, Pontiac, Mich., assignor to American Forging and Socket Company, Pontiac, Mich., a corporation of Michigan Application March 21, 1947, Serial No. 736,140

2 Claims. (Cl. 74—517)

This invention relates to improvements in vehicle brake actuating means.

In conventional vehicle brake actuating means of the push or pull types, involving a handle (or foot pedal) and leverage producing means, such brake actuating means operates at a substantially uniform or constant ratio throughout the stroke of the handle (or pedal), despite the fact that, as is well known, relatively little power is required to take up the slack or lost motion existing in the brake cable or linkage in the initial stages of the stroke of the handle (or pedal), while relatively much greater power is required in the later stages of the stroke of the handle (or pedal) to actually apply the brakes. Hence it is desirable to provide for a relatively rapid early movement of the handle (or pedal) through the initial stages, coupled with means for varying the effective leverage in the later stages.

Accordingly, it is an important object of the present invention to provide brake actuating means embodying this desirable action through the medium of mechanism affording variable ratio of leverage increasing toward the brake applying end of the stroke of the handle (or pedal).

Another important object of this invention is to provide in such mechanism means automatically effective to vary the ratio of leverage exerted thereby at different points along the path of travel of such mechanism as the brakes are being applied.

It is further found, in the conventional brake actuating means of the character referred to hereinabove, that no means is provided for varying the leverage exerted in accordance with the effort required at various points along the path of travel of the mechanism used in application of the brakes, which varies in different makes and installations of brakes, as to eliminate any humps in the brake handle effort curve. Hence, it is an important object of the present invention to provide, in brake actuating mechanism of the character herein referred to, means operating to produce an abrupt taking up of the brake cable or linkage slack or lost motion at the beginning of the brake applying stroke of the handle (or foot lever) while devoting the remainder of the stroke to smooth application of the brakes, with the ratios of exertion of brake applying power being varied in accordance with the effort required at different points along the path of travel.

Another important object of this invention is to provide brake actuating means including a track of irregular contour along which a portion of the brake applying mechanism travels as the brakes are applied, the contour of the track varying from one make of car to another, in accordance with the different pressures and movements required for easy and effective brake application.

Other important objects and advantageous features of this invention will be apparent from the following description and the drawings appended thereto, wherein, merely for purposes of illustration, a presently preferred embodiment is set forth.

In the drawings—

Fig. 1 is a diagrammatic side elevation of brake actuating means in accordance with the present invention, showing the operative parts in their "off" positions in full lines, with some of the elements shown in dash lines in their fully applied positions, and Fig. 2 is a front elevation of the brake actuating mechanism shown in Fig. 1.

In the illustrated embodiment, the brake actuating means is mounted upon the motor side of the dashboard 111, with only the handle 112 and handle rod 112a extending into the passenger compartment of the vehicle, where the handle rod is guided in a nipple 112b fixed below the instrument panel 110. A flexible rubber grommet 111b may be fixed in the dashboard 111 to prevent fumes from the motor entering the passenger compartment, without restricting handle rod 112a in its sliding movements to apply and release the brake. The longer toggle link 123 is pivotally connected at its lower end to an upstanding bracket arm 60a carried by sleeve 60 encircling handle rod 112a adjacent its forward extremity between a struckup shoulder 65 on the handle rod and a latching pawl 66 at the end of the handle rod. As best shown in Fig. 2, bracket arm 60a is offset laterally of the axis of handle rod 112a, and toggle link 123 is formed of two strips of sheet metal of different lengths bent for reinforcement purposes and welded, or otherwise suitably secured, to each other intermediate their ends. The longer strip 123a is pivotally secured to bracket arm 60a, as by pivot pin 61. A roller 62 is journalled between spaced portions of the two strips forming toggle 123, as on a pintle 63 mounted in apertures adjacent the lower extremity of the shorter strip 123b and an intermediate portion of the longer strip 123a (Fig. 2).

Standard 121 and track 120 are herein shown as integrally formed, and are fixed in desired position upon the motor side of dashboard 111 by lateral flanges 121a. The upper edge 152 of track 120 on which roller 62 is adapted to roll is irregularly contoured so as to cause the roller 62, and hence the link 123, to move both vertically and horizontally in its transit from the forward toward the rearward end of track 120, as handle 112 is pulled rearwardly toward brake applying position shown in dash lines in Fig. 1, in such wise that while the pull on the brake cable 146 will be of low leverage power in the first stages of the handle movement, the movement of cable 146 will be rapid to thereby quickly take up the slack or lost motion in the brake system, and then further handle movement will resolve itself into a comparatively smooth exertion of leverage so as to product gradual full application of the brakes without intermediate humps in the effort curve of the brake lever handle 12 as it is drawn rearwardly.

The desired curvature of track surface 152 may be determined empirically. The forward end of the effective working surface of the track 152 is shown as having a relatively short incline or upcurve to produce the above-described rapid taking up of the slack in the brake system. It will be understood, however, this incline may be more gradual in practice. As herein shown, this comparatively steep incline is arranged as the rear wall of a notch or depression into which the roller 62 drops when the brakes are fully released by the return of handle 112 and the brake actuating mechanism to its forward or "off" position. The contour of the track surface 152 beyond the above mentioned upward incline may vary with different makes and models of vehicles, since the profile of this contour depends upon the pressures and movements required to smoothly apply the brakes in each case. Shorter toggle link 122 is pivoted at one end to the upper portion of fixed standard 121 and at its other end to the upper extremity of longer toggle link 123, as by pivot pin 63a, and the brake cable link 145 is also pivoted at its upper end upon such pivot pin 63a. Brake cable (or linkage) 146 is secured to the lower portion of stirrup-shaped brake cable link 145.

It will be noted that the illustrated embodiment is compactly arranged, has relatively few parts, and can be economically manufactured and installed. The curvature of the upper surface 152 of track 120 may readily be varied as desired, and is herein shown as including a portion arranged to impart an initial sharp rise, and another portion arranged to impart a gradual decline to aid in effecting a smooth gradual full application of the brakes. The profile of the contour of the irregular track surface varies with different makes and models of vehicles.

In operation, with the full line showing in Fig. 1 depicting the "off" position of the brakes and brake actuating mechanism, the toggle 122, 123 being nearly in a straight line position, the brakes are applied by pulling rearwardly upon handle 112. Sleeve 60 is moved rearwardly with the handle, thereby causing toggle link 123 to move toward a vertical position and exert a quick pull on brake cable 146 as roller 62 climbs the initial sharp rise portion of irregular track portion 152, thereby taking up any slack in the cable or lost motion in the brakes or operating mechanism. Roller 62 after reaching the high point of curved track 152, then moves along the declining surface of the track as herein shown, with toggle link 123 moving into the almost perpendicular position shown in dash lines in Fig. 1 when the brakes are fully applied.

The means for locking the brake actuating mechanism in brake applied position comprises the latching pawl 66 carried by and extending radially beyond the periphery of the handle rod 112a and a ratchet tooth 67 carried by and depending below the track 120 (Fig. 1) at substantially the point reached by pawl 66 when the brakes are fully applied. A torsional spring 68 encircles handle rod 112a with its ends extending horizontally into engagement with pawl 66 and sleeve 60 respectively, whereby handle rod 112a and pawl 66 are yieldingly held in substantially the positions shown in full lines in Fig. 1 at all times except when the handle is manually turned against the tension of spring 68, or pawl 66 slides up and over tooth 67 during the application of the brakes, into substantially the position shown in dash lines in Fig. 1.

To release the brakes, it is only necessary to twist handle 112 until pawl 66 rotates out of contact with tooth 67, whereupon the pull of the brake cable 146 will move the brake actuator parts into the full line starting positions of Fig. 1, with the brakes fully released. Spring 68 will restore handle 112 and associated elements to normal positions when the operator's grasp on the handle is released.

While the illustrated embodiment is believed to adequately fulfill the objects and advantages hereinabove stated, it is to be understood that modification and variation may readily be made, within the spirit of the invention and scope of the subjoined claims.

Having described my invention, I claim:

1. Brake applying mechanism for automobiles including a handle rod guided for substantially horizontal movements in the dashboard and instrument panel of the automobile, a handle arranged at one end of the handle rod within the passenger compartment, a toggle arranged in the engine compartment and having one link pivoted adjacent the dashboard and the other link pivotally mounted upon said handle rod, an intermediate pivot connecting said links, a brake applying cable pivotally connected to said intermediate toggle pivot, and means for moving said brake cable connection through irregular distances substantially vertically when said handle is moved substantially horizontally, including a roller mounted on said handle connected toggle link intermediate its ends, a standard mounted upon the engine compartment side of the dashboard and having a track portion provided with irregular surfaces thereon arranged to be contacted by said roller during the horizontal movements of the handle rod, whereby the angulations of said track surfaces will produce initially a low-leverage quick pull on said cable to take up the slack therein and thereafter a gradual pull of substantially greater and variable leverage.

2. Brake applying mechanism for automobiles including a handle rod guided for substantially horizontal movements in the dashboard and instrument panel of the automobile, a handle arranged at one end of the handle rod within the passenger compartment, a toggle arranged in the engine compartment and having one link pivoted adjacent the dashboard and the other link pivotally mounted upon said handle rod, an intermediate pivot connecting said links, a brake applying cable pivotally connected to said intermediate toggle pivot, and means for moving said brake cable connection through irregular distances substantially vertically when said handle is moved substantially horizontally, including a guide track mounted between said handle rod and intermediate toggle pivot, the upper surface of said track being irregular to variably control the leverages exerted by said toggle at different points, and a roller pivoted on said handle rod connected toggle link intermediate its ends and arranged to ride upon said irregular track surface.

RAYMOND R. PETERSON.

REFERENCES CITED

The following references are of record in the file of this patent:

UNITED STATES PATENTS

| Number | Name | Date |
| --- | --- | --- |
| 692,948 | Van Dyke | Feb. 11, 1902 |
| 1,724,512 | Pietzsh | Aug. 13, 1929 |
| 1,848,896 | Martindill | Mar. 8, 1932 |
| 1,898,869 | Dadd | Feb. 21, 1933 |
| 2,112,607 | Pooley | Mar. 29, 1938 |
| 2,437,396 | McCarthy | Mar. 9, 1948 |